United States Patent
Beye et al.

(10) Patent No.: US 10,796,304 B2
(45) Date of Patent: Oct. 6, 2020

(54) SYSTEM AND METHOD OF MANAGING COMPUTING RESOURCES

(71) Applicant: Bank of America Corporation, Charlotte, NC (US)

(72) Inventors: Rick A. Beye, Highland Beach, FL (US); Rahul G. Isola, Charlotte, NC (US); Scott A. Sims, Tega Cay, SC (US)

(73) Assignee: Bank of America Corporation, Charlotte, NC (US)

( * ) Notice: Subject to any disclaimer, the term of this patent is extended or adjusted under 35 U.S.C. 154(b) by 360 days.

(21) Appl. No.: 15/620,363

(22) Filed: Jun. 12, 2017

(65) Prior Publication Data

US 2018/0357641 A1    Dec. 13, 2018

(51) Int. Cl.
  *G06Q 20/40* (2012.01)
  *G06Q 20/32* (2012.01)

(52) U.S. Cl.
  CPC ....... *G06Q 20/401* (2013.01); *G06Q 20/3224* (2013.01)

(58) Field of Classification Search
  CPC .................. G06Q 20/401; G06Q 20/3224
  See application file for complete search history.

(56) References Cited

U.S. PATENT DOCUMENTS

| | | | | |
|---|---|---|---|---|
| 7,857,212 | B1 * | 12/2010 | Matthews | G06Q 20/20 235/380 |
| 8,254,910 | B1 * | 8/2012 | Breau | H04W 4/08 455/424 |
| 8,285,681 | B2 | 10/2012 | Prahlad et al. | |
| 8,527,549 | B2 | 9/2013 | Cidon | |
| 8,762,642 | B2 | 6/2014 | Bates et al. | |
| 8,788,628 | B1 | 7/2014 | Taylor et al. | |
| 8,805,951 | B1 | 8/2014 | Faibish et al. | |
| 8,805,968 | B2 | 8/2014 | Taylor et al. | |
| 8,832,820 | B2 | 9/2014 | Barjatiya et al. | |

(Continued)

OTHER PUBLICATIONS

Xiaomi inc files patent application for method and device for binding account number to token key. (Oct. 29, 2016). Indian Patents News Retrieved from https://dialog.proquest.com/professional/docview/1833257764?accountid=131444 on Jul. 30, 2020 (Year: 2016).*

(Continued)

*Primary Examiner* — Kito R Robinson
(74) *Attorney, Agent, or Firm* — Michael A. Springs

(57) ABSTRACT

In one or more embodiments, one or more systems, processes, and/or methods may receive, via a network, a multiple positions corresponding to multiple physical locations of a consumer device, may receive, via the network, a position of a physical location of a financial transaction device, and may receive a request for a financial transaction, and may determine a transaction authorization based on a path indicated by the multiple positions and the position of the physical location of the financial transaction device. For example, a path and/or track may be established via periodical reports of the position information from the consumer device, which may provide and/or indicate an authenticity metric and/or a validity metric to a current position attribute when the current position attribute is utilized in a financial transaction.

20 Claims, 11 Drawing Sheets

(56) References Cited

U.S. PATENT DOCUMENTS

| | | | |
|---|---|---|---|
| 8,850,130 B1 | 9/2014 | Aron et al. | |
| 9,008,691 B2* | 4/2015 | Busch | H04W 4/38 |
| | | | 455/456.1 |
| 9,147,195 B2 | 9/2015 | Sivaramakrishnan et al. | |
| 9,256,374 B1 | 2/2016 | Aron et al. | |
| 9,350,717 B1* | 5/2016 | Siddiqui | H04W 4/80 |
| 9,380,421 B1* | 6/2016 | Vltavsky | G06Q 20/4014 |
| 9,398,087 B1 | 7/2016 | Hosie et al. | |
| 9,424,437 B1 | 8/2016 | Ancin et al. | |
| 9,454,398 B2 | 9/2016 | Hacker | |
| 9,479,503 B2 | 10/2016 | Griffin et al. | |
| 9,565,200 B2 | 2/2017 | Bacastow et al. | |
| 9,571,282 B1 | 2/2017 | Aggarwal et al. | |
| 9,578,002 B2 | 2/2017 | Wu | |
| 9,596,223 B1 | 3/2017 | Mezel et al. | |
| 10,601,818 B2* | 3/2020 | Le Saint | H04L 63/0428 |
| 2009/0006234 A1* | 1/2009 | Han | G06Q 40/00 |
| | | | 705/35 |
| 2009/0254440 A1* | 10/2009 | Pharris | G06Q 20/105 |
| | | | 705/17 |
| 2011/0231233 A1* | 9/2011 | Iannace | G06Q 30/0224 |
| | | | 705/14.13 |
| 2012/0271717 A1* | 10/2012 | Postrel | G06Q 30/02 |
| | | | 705/14.58 |
| 2013/0082819 A1* | 4/2013 | Cotterill | G06F 21/40 |
| | | | 340/5.51 |
| 2013/0132274 A1* | 5/2013 | Henderson | G06Q 20/4012 |
| | | | 705/41 |
| 2013/0332358 A1* | 12/2013 | Zhao | G06Q 20/12 |
| | | | 705/44 |
| 2014/0279538 A1* | 9/2014 | Singh | G06Q 20/3224 |
| | | | 705/44 |
| 2014/0341441 A1* | 11/2014 | Slaby | G06F 21/32 |
| | | | 382/117 |
| 2015/0051953 A1* | 2/2015 | Howe | G06Q 30/0205 |
| | | | 705/7.34 |
| 2015/0088746 A1* | 3/2015 | Hoffman | G06Q 20/40145 |
| | | | 705/44 |
| 2015/0142658 A1* | 5/2015 | Li | G06Q 20/32 |
| | | | 705/44 |
| 2015/0142667 A1* | 5/2015 | Landrok | G06Q 20/3823 |
| | | | 705/67 |
| 2015/0161586 A1* | 6/2015 | Bailey | G06Q 20/202 |
| | | | 705/44 |
| 2015/0178726 A1* | 6/2015 | Wen | G06Q 20/32 |
| | | | 705/44 |
| 2015/0277964 A1* | 10/2015 | Atkins | G06Q 40/00 |
| | | | 718/101 |
| 2015/0310434 A1* | 10/2015 | Cheung | G06Q 20/085 |
| | | | 705/44 |
| 2015/0356562 A1* | 12/2015 | Siddens | G06Q 20/4016 |
| | | | 705/44 |
| 2016/0117705 A1* | 4/2016 | Robinson | G06Q 30/0205 |
| | | | 705/7.34 |
| 2016/0132851 A1* | 5/2016 | Desai | G06Q 20/202 |
| | | | 705/21 |
| 2016/0140567 A1* | 5/2016 | Hanna | G06Q 20/40145 |
| | | | 705/44 |
| 2016/0188849 A1* | 6/2016 | Eramian | G06F 21/316 |
| | | | 726/5 |
| 2016/0232531 A1* | 8/2016 | Hefetz | G06Q 20/3224 |
| 2016/0315784 A1* | 10/2016 | Wu | H04L 12/2816 |
| 2016/0321643 A1* | 11/2016 | Beck | G06Q 20/3224 |
| 2017/0039218 A1 | 2/2017 | Prahlad et al. | |
| 2017/0046526 A1* | 2/2017 | Chan | G06Q 20/0655 |
| 2017/0091764 A1* | 3/2017 | Lloyd | G06Q 20/401 |
| 2017/0149777 A1* | 5/2017 | Benson | H04L 67/146 |
| 2017/0270497 A1* | 9/2017 | Tsou | G06Q 20/047 |
| 2017/0270528 A1* | 9/2017 | Prakash | G06Q 20/3224 |
| 2017/0345006 A1* | 11/2017 | Kohli | G06Q 20/4093 |
| 2017/0357971 A1* | 12/2017 | Pitz | G06Q 20/401 |
| 2017/0364901 A1* | 12/2017 | Chandrasekaran | H04B 17/318 |
| 2018/0004930 A1* | 1/2018 | Csinger | H04L 9/3234 |
| 2018/0012222 A1* | 1/2018 | Berger | G06Q 20/204 |
| 2018/0349912 A1* | 12/2018 | Fiterman | G06Q 20/40145 |

OTHER PUBLICATIONS

Think Cloud Compliance, "Secure Biometric Authentication: A Fundamental Building Block for Achieving Trusted Cloud Services," Jeremy Grant, © 2016 Microsoft Corporation (14 pgs).

"Future—Proofing Your Authentication Infrastructure, Key Strategies for Maximizing Security and Flexibility in the Long Term," White Paper, © 2011 SafeNet, Inc. (7 pgs).

Cloud Computing News, "Metadata, Scanning and Security in the Cloud," written by Franz Freidrich Liebinger Portela (14 pgs.).

"Architectures and Protocols for Secure Information Technology Infrastructures," by Antonio Ruiz Martinez et al., Security and Privacy Issues in Cloud Computing, p. 27, ® 2014 by IGI Global.

* cited by examiner

SYSTEM AND METHOD OF MANAGING COMPUTING RESOURCES

TECHNICAL FIELD

Certain embodiments of this disclosure relate generally to managing computing resources and, more particularly, to systems and methods for authorizing access to computing resources.

BACKGROUND

Networks allow users to access various types of computing resources, which may include hardware resources and/or software resources. Examples of hardware resources include computer networks, servers, memory, and so on. Examples of software resources include applications, services, data, and so on. The computing resources may be used to process transactions. Unfortunately, some of the transactions received by the computing resources may be unauthorized. To prevent unauthorized use of computing resources, access control techniques may be put into place. Examples of access control techniques include identifying and verifying the entity, process, or mechanism requesting access to the computing resource.

SUMMARY

One or more embodiments of the present disclosure may provide one or more technical advantages. As an example, a technical advantage of one or more embodiments may include an authenticity metric and/or a validity metric to a current position attribute when the current position attribute is utilized in a financial transaction. Other advantages may be apparent to those of ordinary skill in the art. In one or more embodiments, one or more systems, processes, and/or method may receive, via a network, multiple positions corresponding to multiple locations of a consumer device, may receive, via the network, a position of a physical location of a financial transaction device, and may receive a request for a financial transaction. For example, a path and/or track may be established via periodical reports of the position information from the consumer device, which may provide and/or indicate an authenticity metric and/or a validity metric to a current position attribute when the current position attribute is utilized in a financial transaction. In one instance, the authenticity metric and/or the validity metric of the current position attribute, when the current position attribute is utilized in a financial transaction, may be utilized in preventing fraudulent transactions. In another instance, the authenticity metric and/or the validity metric of the current position attribute, when the current position attribute is utilized in a financial transaction, may be utilized in preventing and/or mitigating one or more false-positives in preventing fraudulent transactions, even though one or more circumstances may be considered unusual, according to some metric. In one or more embodiments, the one or more systems, processes, and/or method may determine a transaction authorization based on a path indicated by the multiple positions and the position of the physical location of the financial transaction device. For example, a transaction may be permitted if one or more attributes associated with the transaction are satisfied. For instance, the one or more attributes may include an identification of a business establishment (e.g., a retail store, a restaurant, a vehicle rental business, a coffee shop, a department store, a movie theatre, a car wash, an airline ticket counter, etc.), a position of the business establishment, a merchandise identification, a position of the consumer device, and a position of the person (e.g., the consumer), among others.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
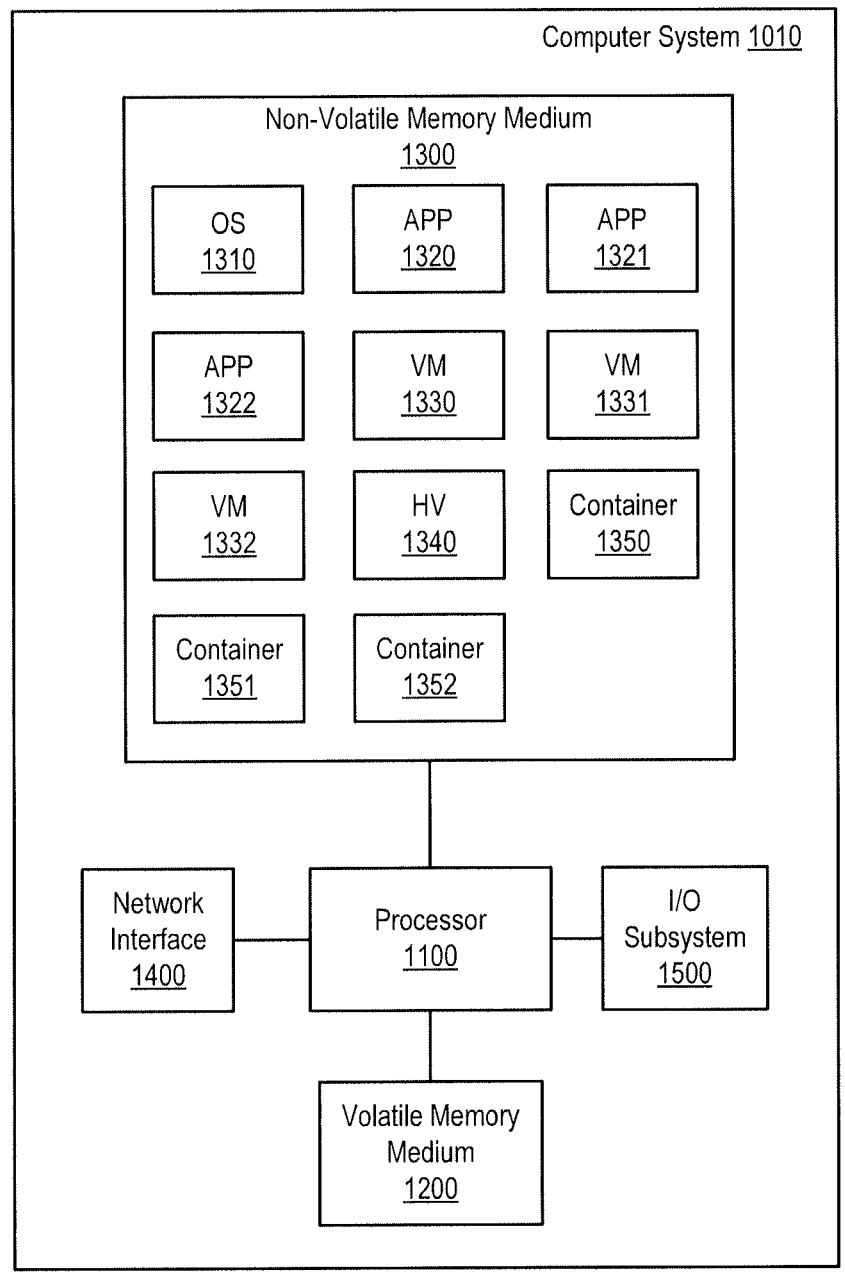
FIG. 1 illustrates an example of a computer system, according to one or more embodiments.

In the following description, details are set forth by way of example to facilitate discussion of the disclosed subject matter. It should be apparent to a person of ordinary skill in the field, however, that the disclosed embodiments are for purposes of example and are not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In the past, fraud has been a billion-dollar business and has been increasing every year. In recent years, utilization of new technologies has provided various ways in which criminals may commit fraud. Various systems and techniques have been utilized in detecting and preventing fraud in financial transactions. Some fraud can include many instances or incidents involving repeated transgressions using the same method, and fraud instances can be similar in content and appearance but may not be identical. Some fraud detection systems and techniques have been weakened and others indicate false positives.

One or more embodiments of the present disclosure may allow for improved fraud detection. For example, in determining whether computing resources may process a requested transaction, certain embodiments may provide a physical location of a transaction device, a path of physical locations of a consumer device, and/or one or more other attributes as credentials in an access control technique. The access control technique uses these credentials to verify whether the transaction is authorized.

In one or more embodiments, a transaction may be permitted if one or more attributes associated with the transaction are satisfied. For example, the one or more attributes may include an identification of a business establishment (e.g., a retail store, a restaurant, a vehicle rental business, a coffee shop, a department store, a movie theatre, a car wash, an airline ticket counter, etc.), a position of the business establishment, a merchandise identification, a position of a consumer device, and a position of the person (e.g., the consumer), among others. For instance, a consumer device of a person may obtain the one or more attributes, and the consumer device may provide the one or more attributes to a financial entity associated with the person.

In one or more embodiments, a position may include coordinates. In one example, the position may include Cartesian coordinates. For instance, the Cartesian coordinates may be in a "X, Y, Z" form. In another example, the position may include spherical coordinates. In one instance, the spherical coordinates may be in a latitude and longitude form. In a second instance, the spherical coordinates may be in a latitude, longitude, and altitude form. In another instance, the spherical coordinates may be in a "θ, ϕ, ρ" form.

In one or more embodiments, the consumer device may determine coordinates of a location via a global position system (GPS). For example, the GPS may include a constellation of ranging signal generating devices. For instance, the ranging signals generating devices may include satellites and/or pseudolites. In one or more embodiments, a pseudolite (e.g., a "pseudo-satellite") may be a device that may not be a satellite but may perform one or more functions associated with one or more satellites. For example, a pseudolite may include one or more receivers and/or one or more transmitters that may be utilized in implementing a ground-based (GPS) alternative. In one instance, pseudolites may be utilized in permitting the consumer device to achieve small or smaller radii of uncertainty (e.g., less than one meter) in determining a position. In another instance, pseudolites may be utilized in permitting the consumer device to compute a position when ranging signals from three or more GPS satellites or four or more GPS satellites are not available to the consumer device.

In one or more embodiments, the consumer device may communicate with the financial entity via a private channel. For example, communicating the one or more attributes with the financial entity via the private channel may inhibit and/or prevent fraudulent financial transactions. For instance, restricting access to or preventing access to the one or more attributes may inhibit and/or prevent the fraudulent financial transactions. In one or more embodiments, utilizing the private channel may include communications independent from a business establishment. For example, when communicating the one or more attributes with the financial entity via the private channel, the business establishment or agents of the business establishment (e.g., corporate officers of the business establishment, employees of the business establishment, etc.) may not be able to alter or duplicate the one or more attributes to enact and/or achieve fraudulent behavior into one or more financial transactions utilizing financial information associated with the person and/or the consumer device.

In one or more embodiments, utilizing the private channel may include utilizing terrestrial communications and/or satellite communications. In one example, the consumer device may communicate in a wireless fashion with wireless devices of a terrestrial communications system. In another example, the consumer device may communicate in a wireless fashion with wireless devices of a satellite communications system. For instance, the satellite communications system may include multiple satellites in one or more low Earth orbits. In one or more embodiments, utilizing the private channel may include utilizing one or more licensed spectrums of radio frequencies. For example, the one or more licensed spectrums of radio frequencies may be licensed from one or more of a Federal Communications Commission (FCC), an International Telecommunication Union (ITU), a European Conference of Postal and Telecommunications Administrations, and an Inter-American Telecommunication Commission, among others. In one or more embodiments, utilizing the private channel may include utilizing an encryption protocol and/or an encryption system. In one example, data conveyed via the private channel may include utilizing an encryption method and/or process. In another example, data conveyed via the private channel may include utilizing an integrated circuit (IC) that may implement an encryption method and/or process.

In one or more embodiments, the consumer device may perform periodic actions. For example, the periodic actions may include transactions within periods of time transpiring (e.g., thirty seconds, one minute, five minutes, etc.). For instance, the consumer device may periodically report and/or transmit position information to the financial entity.

In one or more embodiments, a period of time transpiring may be based on a type of communication network and/or system utilized. In one example, if the consumer device communicates with a terrestrial communication system, the consumer device may provide periodical reports every minute. In another example, if the consumer device communicates with a satellite communication system, the consumer device may provide periodical reports every five minutes. In this fashion, a current position attribute may be considered valid or invalid based on a path and/or track established via the periodical reports of the position information, according to one or more embodiments. For example, the path and/or track established via the periodical reports of the position information from the consumer device via the private channel may provide an authenticity metric and/or a validity metric to the current position attribute when the current position attribute is utilized in a financial transaction. In one instance, the authenticity metric and/or the validity metric of the current position attribute, when the current position attribute is utilized in a financial transaction, may be utilized in preventing fraudulent transactions. In another instance, the authenticity metric and/or the validity metric of the current position attribute, when the current position attribute is utilized in a financial transaction, may be utilized in preventing and/or mitigating one or more false-positives in preventing fraudulent transactions, even though one or more circumstances may be considered unusual, according to some metric.

In one or more embodiments, the consumer device may not be able to periodically provide and/or transmit position information to the financial entity, and the consumer device may acquire, log, and/or store the position information at periodic intervals. For example, the consumer device may be outside a range of communications utilizable to provide the financial entity position information on a periodic basis. For instance, the consumer device may provide position information acquired at periodic intervals to the financial entity when the consumer device is able to provide information to the financial entity. As one example, a consumer device on a boat might be outside a range of a terrestrial network. The consumer device may store its position at periodic intervals while outside the range of the terrestrial network. When the consumer device moves within coverage of the terrestrial network (e.g., when the boat is near the dock), the consumer device may provide the financial entity with the consumer device's stored position information. In one or more embodiments, the consumer device need not provide the financial entity with position information that is older than, e.g., one day or another period of time.

In one or more embodiments, one or more identification mechanisms, instruments, and/or structures may be utilized. For example, the consumer device may be utilized with the one or more identification mechanisms, instruments, and/or structures. In one instance, the consumer device may be or include a wireless telephone (e.g., a cellular telephone, a satellite telephone, etc.), and the wireless telephone may be utilized with the one or more identification mechanisms, instruments, and/or structures, such as a smart watch, a radio frequency identification (RFID) chip, a palm print of the person associated with the wireless telephone, a finger print of the person associated with the wireless telephone, a biometric identification of the person associated with the wireless telephone, etc. For instance, the consumer device may utilize G-Glass services, which may provide an ability for the person associated with the consumer device to hold the consumer device in his or her hand while the consumer device utilizes one or more portions of a palm of the hand for identification purposes.

In one or more embodiments, a combination of information from the consumer device and information from the one or more identification mechanisms, instruments, and/or structures may be utilized in preventing fraudulent transactions and/or mitigating one or more false-positives in preventing fraudulent transactions. As an example, suppose a person initiates a transaction that is determined to be unusual for that person, for example, based on the distance from the person's home, the monetary amount of the transaction, and/or other details of the transaction. One or more embodiments may determine to permit the transaction if the transaction was both initiated within the proximity of the consumer device (such as the person's wireless telephone) and within the proximity of another device associated with the person (such as the person's smart watch). For example, the person may pre-configure a binding to identify the device(s) that the person permits to be used for the purposes of authorizing transactions. For example, the person may choose to include device(s) that the person frequently uses/ carries with him, such as the person's telephone, smartwatch, car, etc.

In one or more embodiments, an initialization of a binding and/or combination of the consumer device with the one or more identification mechanisms, instruments, and/or structures may be based on a location. For example, the location may include a designated location, such as a residence of the person, a location of the financial entity (e.g., a headquarters, a branch location, etc.), or some other designated area or location. For instance, when the person is at a designated location or area, an agent of the financial entity may not be needed to be present for the person to bind and/or combine a new consumer device to an identity of the person. The person, at a designated location, may utilize an online application (APP) or a smartphone APP, connect to a computer system of the financial entity, and bind the new consumer device to the identity of the person, for example.

In one or more embodiments, a designated area or designated location (e.g., designated physical location) may be established over a period of time transpiring. In one example, the periodically updated position information may indicate that the person has spent a number of nights at a location. For instance, when the person has spent the number of nights at the location, where the number of nights is above a threshold, the location where the user has spent the number of nights above the threshold may be utilized to bind the new consumer device to the identity of the person. In another example, multiple positions of received multiple positions may be associated with a physical location and may be consistently associated with a portion of a day (e.g., lunch time, night time, etc.), and a position of the physical location and/or an identification of the physical location may be added to a profile, associated with the consumers, as the designated location. For instance, the multiple positions of received multiple positions may be or indicate a same position.

In one or more embodiments, a minimum number of identifications may be based on a value of a financial transaction. In one example, two or more identifications from two or more respective consumer devices may be required for a transaction above five hundred dollars. In another example, two or more identifications from three or more respective consumer devices may be required for a transaction above one thousand dollars.

In one or more embodiments, a minimum number of identifications may be based on a distance from a location. In one example, two or more identifications from two or more respective consumer devices may be required for a transaction at a location that is more than ten miles from a location of a residence of the person. In another example, three or more identifications from three or more respective consumer devices may be required for a transaction at a location that is more than thirty miles from a location of a residence of the person.

In one or more embodiments, a minimum number of identifications may be utilized for any financial transaction to occur. In one example, the persona may drive up to a coffee shop and extend his or her hand, that is proximate to a smartwatch, and a combination of a tray of the coffee shop and smartwatch at a same location, where a combination of a minimum number of data points is sufficient in permitting an initialization of payment for goods upon the tray. In one instance, a luminescent indicator of the tray may turn green, indicating that the payment for the goods upon the tray has been successfully transacted. In another instance, the luminescent indicator of the tray may turn red, indicating that the payment for the goods upon the tray has not been successfully transacted.

In a second example, the person may walk up to an automated teller machine (ATM) and hold his or her hand out with the smartwatch proximate to the hand, and based on the minimum number of identifications, money may be dispensed to the person. For instance, the minimum number of identifications, in combination, may confirm that the person is authorized for one or more distributions of money from the ATM. In another example, the person may walk up to a vending machine and hold his or her hand out with a ring device worn by a hand, and based on the minimum number of identifications, one or more items from the vending machine may be dispensed to the person.

In one or more embodiments, one or more data points of identification may include body temperature, a number of heartbeats per time period, a blood pressure measurement, a blood oxidation level, a scan of cell tissue of the person, an arterial and/or vein pattern proximate to a surface of a skin of the user, and/or other biological measurements. For example, the one or more data points of identification may be utilized in authenticating an identification of the person. For instance, an authentication of an identification of the person may be utilized in permitting and/or authorizing a financial transaction. In one or more embodiments, when a request for a financial transaction is initiated and/or received, a process and/or method of determining the one or more data points of identification may be initialized and/or initiated.

In one or more embodiments, the consumer device may include an IC that may store profile information associated with the user. In one example, the IC may be a proprietary IC that a maker of the consumer device may not access. In another example, the profile information associated with the user may include information associated with purchases of the user. For instance, the information associated with purchases of the user may include information associated with weekly purchases of spearmint gum and/or milk from a local convenient store (e.g., a convenient store within a distance from a location of a residence of the user). In one or more embodiments, the profile information stored by the IC may provide a sufficient level of information about one or more price points associated with pending transactions. For example, the profile information stored by the IC may be utilized in determining that one or more pending transactions conform to normal purchases of the user. In one instance, the profile information stored by the IC may permit and/or provide an authorization for the one or more pending transactions. In another instance, the profile information stored by the IC may be utilized in determining that a pending transaction is a repetitive transaction and may permit and/or provide an authorization for the pending transaction.

In one or more embodiments, profile information associated with the consumer may include a predicted purchase. For example, the person may have purchases a first model of a laptop computing device, and the predicted purchase may be for a second model of a laptop computing device a period of time subsequent the purchase of the first model of the laptop computing device. For instance, predictions within the profile information may be classified as a suggested profile. In one or more embodiments, the suggested profile may be utilized in determining an authorization for a financial transaction.

Turning now to FIG. 1, an example of a computer system is illustrated, according to one or more embodiments. As shown, a computer system 1010 may include a processor 1100, a volatile memory medium 1200, a non-volatile memory medium 1300, a network interface 1400, and an input/output (I/O) subsystem 1500. As illustrated, volatile memory medium 1200, non-volatile memory medium 1300, network interface 1400, and I/O subsystem 1500 may be communicatively coupled to processor 1100.

As shown, non-volatile memory medium 1300 may include an operating system (OS) 1310, applications (APPs) 1320-1322, virtual machines (VMs) 1330-1332, a hypervisor (HV) 1340, and containers 1350-1352. In one or more embodiments, one or more of OS 1310, APPs 1320-1322, VMs 1330-1332, HV 1340, and containers 1350-1352 may include instructions executable by processor 1100. In one example, processor 1100 may execute instructions of one or more of OS 1310, APPs 1320-1322, VMs 1330-1332, HV 1340, and containers 1350-1352 via non-volatile memory medium 1300. In another example, one or more portions of the instructions of the one or more of OS 1310, APPs 1320-1332, VMs 1330-1332, HV 1340, and containers 1350-1352 may be transferred to volatile memory medium 1200, and processor 1100 may execute the one or more portions of the instructions of the one or more of OS 1310, APPs 1320-1332, VMs 1330-1332, HV 1340, and containers 1350-1352 via volatile memory medium 1200.

In one or more embodiments, HV 1340 may include one or more of software, firmware, and hardware that creates and executes one or more VMs (e.g., one or more of VMs 1330-1332). For example, computer system 1010 may be considered host machine when HV 1340 executes and one or more of VMs 1330-1332 are executed via HV 1340. For instance, a virtual machine (VM) (e.g., a VM of VMs 1330-1332) may be considered a guest machine. In one or more embodiments, a VM may provide one or more structures and/or functionalities as those described with reference to computer system 1010 (e.g., singularly or via nesting of hypervisors and virtual machines). In one example, the VM may provide emulated devices to a guest OS that executes via the VM. In another example, the VM may provide hardware devices to the guest OS that executes via the VM. In one instance, the guest OS may access hardware in a pass-through configuration. In another instance, the guest OS may access hardware in a single root input/output virtualization (SR-IOV) configuration. In one or more embodiments, guest operating systems may share one or more devices of a host machine. For example, the guest operating systems may share one or more of a network adapter via virtual network adapters and a storage device via a virtual storage devices (e.g., virtual disks, virtual memory, etc.), among others.

In one or more embodiments, OS level virtualization may be utilized. For example, OS level virtualization may include a kernel of an OS that permits multiple isolated user space instances of collections of processes (e.g., programs, applications, services, etc.). For instance, these instances are often referred to as "containers", "software containers", "virtualization engines", or "jails" (e.g., FreeBSD jails, chroot jails, etc.). In one or more embodiments, with OS level virtualization, an OS may behave and/or may appear like multiple different, individual computer systems. For example, little to no overhead may be imposed by OS level virtualization, as processes in OS level virtual partitions may utilize a single system call interface of an OS. For instance, OS level virtual partitions may not be subjected to emulation or be executed via virtual machines. In one or more embodiments, OS level virtualization may be utilized in consolidating computer system hardware or virtual machines by moving services on separate hosts or virtual machines into containers on a computer system or single virtual machine.

In one or more embodiments, a container may be or include software in a file system that includes one or more of instructions executable by a processor (e.g., a program, software, an application, server software, a service, etc.), one or more runtime libraries, one or more system tools, and one or more system libraries, among others. For example, a container may be or include a Docker container, a LXC, or a Kubernetes pod, among others. In one or more embodiments, a container may provide and/or may implement operating system-level virtualization via a virtual environment that includes a separate process space and/or a separate network space, rather than creating and/or implementing a virtual machine.

In one or more embodiments, a container may be or include a pod (e.g., a Kubernetes pod). For example, a pod may provide and/or add a higher level of abstraction to one or more containerized elements. For instance, a pod may include one or more containers that may be warranted to be co-located and/or executed on a computer system (e.g., a host computer system, host machine, etc.) and may share resources of the computer system. In one or more embodiments, a thick container may be or include a pod, and a thin container may include a single container.

In one or more embodiments, containers may provide and/or offer an immutable quality and/or option. For example, a container may be deployed, destroyed, modified, re-constructed and/or re-created, and re-deployed. In one instance, instructions, executable by a processor, of a container may not be modified while the container is executing. In another instance, instructions, executable by a processor, of a container may not be modified once the container is created.

In one or more embodiments, the term "memory medium" may mean a "memory device", a "memory", a "storage device", a "tangible computer readable storage medium", and/or a "computer-readable medium". In one example, a memory medium may be a volatile memory medium. For instance, the volatile memory medium may lose stored data when the volatile memory medium no longer receives power. In a second example, a memory medium may be a non-volatile memory medium. For instance, the non-volatile memory medium may not lose stored data when the volatile memory medium no longer receives power or when power is not applied. In another example, a memory medium may include a volatile memory medium and a non-volatile memory medium.

In one or more embodiments, a volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others.

In one or more embodiments, I/O subsystem 1500 may include or represent a variety of communication interfaces, graphics interfaces, video interfaces, user input interfaces, and/or peripheral interfaces, among others. For example, I/O subsystem 1500 may include one or more of a touch screen, a display, a display adapter, and a universal serial bus (USB) interface, among others. For instance, a touch screen may include circuitry that enables touch functionality in conjunction with a display that is driven by a display adapter.

In one or more embodiments, network interface 1400 may be configured to be coupled to a network. For example, network interface 1400 may permit computer system 1010 to be communicatively coupled to a network. In one instance, network interface 1400 may be configured to be coupled to a wired network. In a second instance, network interface 1400 may be configured to be coupled to a wireless network. In a second instance, network interface 1400 may be configured to be coupled to an optical network.

In one or more embodiments, one or more of volatile memory medium 1200, non-volatile memory medium 1300, network interface 1400, and I/O subsystem 1500 may be communicatively coupled to processor 1100 via one or more buses. For example, a bus may include one or more of a peripheral component interconnect (PCI) bus, a serial peripheral interface (SPI) bus, an inter-integrated circuit ($I^2C$) bus, an enhanced serial peripheral interface (eSPI) bus, a system management bus (SMBus), a universal serial bus, and a low pin count (LPC) bus, among others. In one or more embodiments, one or more of volatile memory medium 1200, non-volatile memory medium 1300, network interface 1400, and I/O subsystem 1500 may be communicatively coupled to processor 1100 via one or more of a PCI-Express (PCIe) root complex and one or more PCIe switches, among others.

In one or more embodiments, processor 1100 may execute instructions in implementing one or more systems, flowcharts, methods, and/or processes described herein. In one example, processor 1100 may execute processor instructions from one or more of memory media 1200 and 1300 in implementing one or more systems, flowcharts, methods, and/or processes described herein. In another example, processor 1100 may execute instructions received via network interface 1400 in implementing one or more systems, flowcharts, methods, and/or processes described herein.

In one or more embodiments, processor 1100 may include circuitry that may interpret and/or execute program instructions and/or process data, among others. For example, processor 1100 may include one or more of a system, a device, and an apparatus that may interpret and/or execute program instructions and/or process data, among others. For instance, processor 1100 may include one or more of a central processing unit (CPU), a microprocessor, a graphics processing unit (GPU), an application processor, a digital signal processor (DSP), and an application specific integrated circuit (ASIC), among others.

Figure 2:
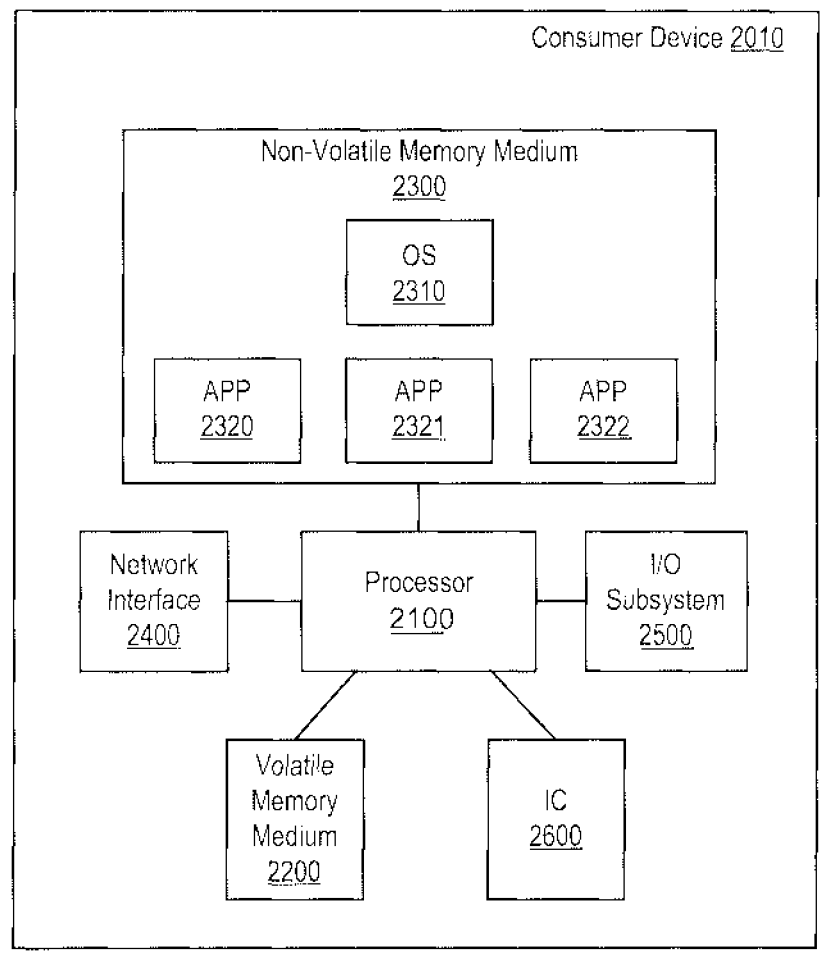
FIG. 2 illustrates an example of a consumer device, according to one or more embodiments.

Turning now to FIG. 2, an example of a consumer device is illustrated, according to one or more embodiments. As shown, a consumer device 2010 may include a processor 2100, a volatile memory medium 2200, a non-volatile memory medium 2300, a network interface 2400, an I/O subsystem 2500, and an IC 2600. In one or more embodiments, consumer device 2010 may include a mobile device, a personal digital assistant (PDA), a wireless telephone (e.g., a cellular telephone, a satellite telephone, etc.), a smartphone, an electronic music player, a consumer electronic device, and/or another suitable device.

As illustrated, volatile memory medium 2200, non-volatile memory medium 2300, network interface 2400, I/O subsystem 2500, and IC 2600 may be communicatively coupled to processor 2100. In one or more embodiments, one or more of volatile memory medium 2200, non-volatile memory medium 2300, network interface 2400, I/O subsystem 2500, and IC 2600 may be communicatively coupled to processor 2100 via one or more buses. For example, the one or more buses may include one or more buses described herein. As shown, non-volatile memory medium 2300 may include an OS 2310 and applications (APPs) 2320-2322. In one or more embodiments, OS 2310 and APPs 2320-2322 may include instructions executable by processor 2100 that may be utilized in implementing one or more flow charts, methods, processes, and/or systems described herein.

In one or more embodiments, processor 2100 may execute instructions in implementing one or more systems, flowcharts, methods, and/or processes described herein. In one example, processor 2100 may execute processor instructions from one or more of memory media 2200 and 2300 in implementing one or more systems, flowcharts, methods, and/or processes described herein. In another example, processor 2100 may execute instructions received via network interface 2400 in implementing one or more systems, flowcharts, methods, and/or processes described herein. In one or more embodiments, processor 2100 may include circuitry that may interpret and/or execute program instructions and/or process data, among others. For example, processor 2100 may include one or more of a system, a device, and an apparatus that may interpret and/or execute program instructions and/or process data, among others. For instance, processor 2100 may include one or more of a CPU, a microprocessor, a GPU, an application processor, a DSP, and an ASIC, among others.

In one or more embodiments, IC 2600 may store profile information associated with a user (e.g., a consumer). For example, IC 2600 may be a proprietary IC that a maker of consumer device 2010 may not access. In one or more embodiments, IC 2600 may include circuitry that may interpret and/or execute program instructions and/or process data, among others. For example, IC 2600 may include one or more of a system, a device, and an apparatus that may interpret and/or execute program instructions and/or process data, among others. For instance, IC 2600 may include one or more of a CPU, a microprocessor, a GPU, an application processor, a DSP, and an ASIC, among others. In one or more embodiments, IC 2600 may be utilized in conveying information via a private channel. In one example, IC 2600 may implement an encryption method and/or process. For instance, IC 2600 may encrypt and/or decrypt information. In another example, IC 2600 may be utilized in one or more wireless communications via the private channel. For instance, IC 2600 may include a transmitter and/or a receiver that may utilize one or more radio frequencies in transmitting and/or receiving information. In one or more embodiments, IC 2600 may include one or more structures and/or functionalities that may implement one or more systems, flowcharts, methods, and/or processes described herein.

Figure 3:
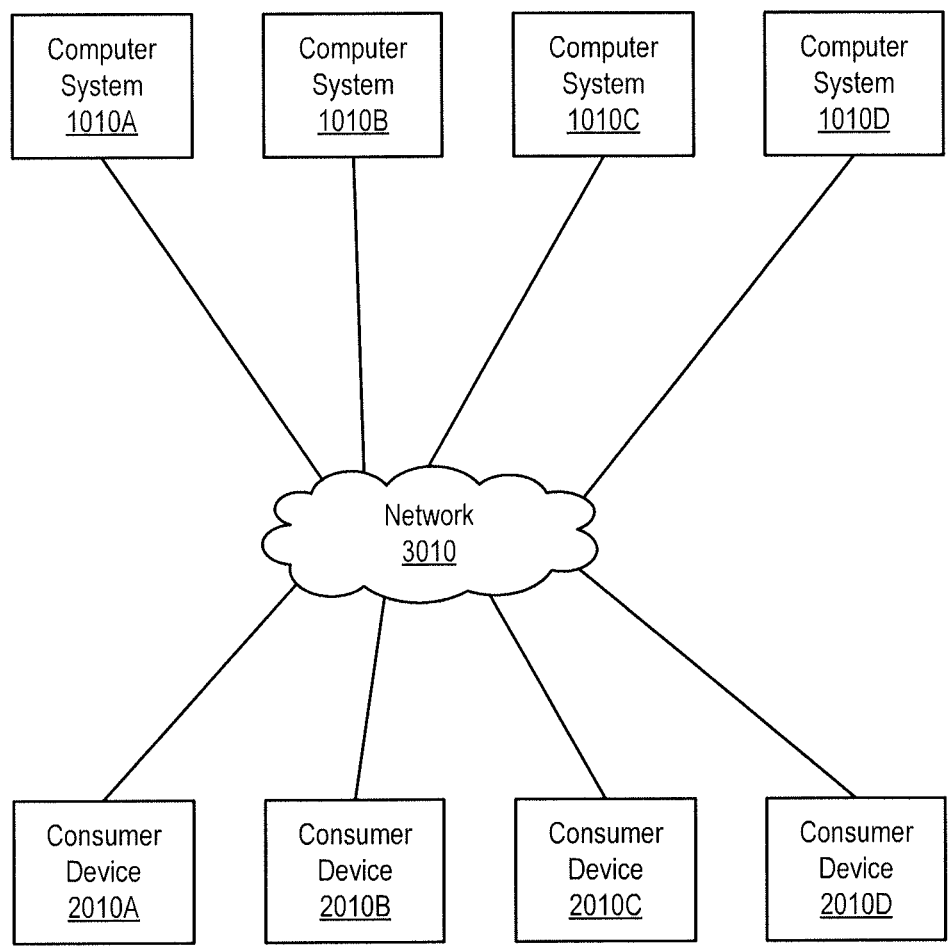
FIG. 3 illustrates an example of computer systems and consumer devices coupled to a network, according to one or more embodiments.

Turning now to FIG. 3, computer systems and consumer devices coupled to a network are illustrated, according to one or more embodiments. As shown, computer systems 1010A-1010D and consumer devices 2010A-2010D may be communicatively coupled to a network 3010. In one or more embodiments, network 3010 may include one or more of a wired network, an optical network, and a wireless network. For example, network 3010 may include one or more of a local area network (LAN), a wide area network (WAN), a wireless LAN (WLAN), a metropolitan area network (MAN), a public switched telephone network (PSTN), a public WAN (e.g., an Internet), a private WAN, a cellular telephone network, a satellite telephone network, and a virtual private network (VPN), among others. In one or more embodiments, network 3010 may be coupled to one or more other networks. For example, network 3010 may be coupled to one or more of a LAN, a WAN, a WLAN, a MAN, a PSTN, a public WAN, a private WAN, a cellular telephone network, a satellite telephone network, and a VPN, among others.

Figure 4:
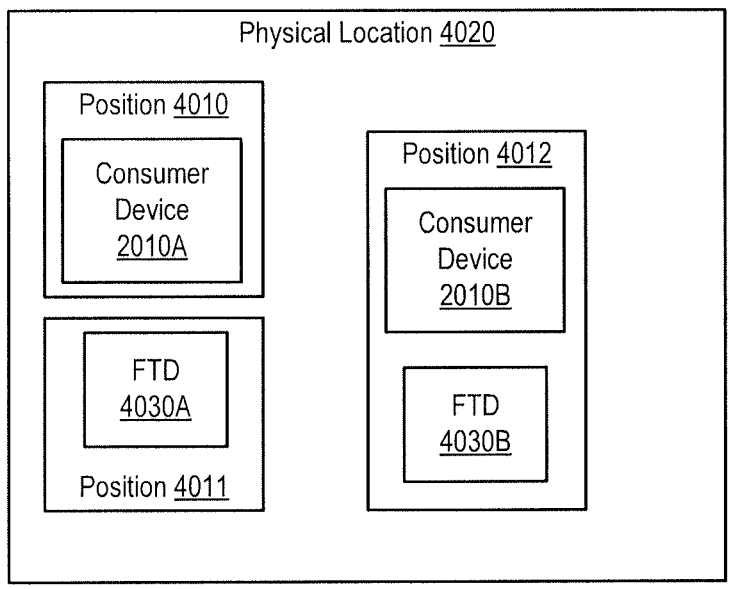
FIG. 4 illustrates examples of consumer devices at positions, according to one or more embodiments.
Figure 4:
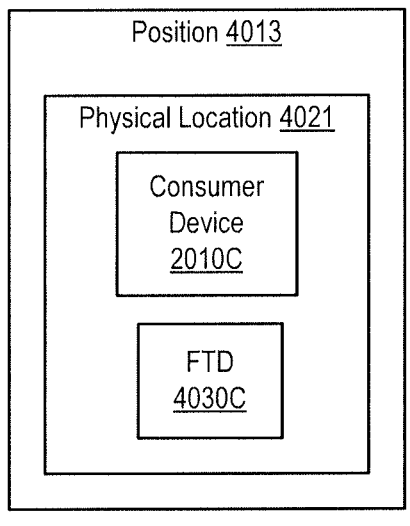
Figure 4:
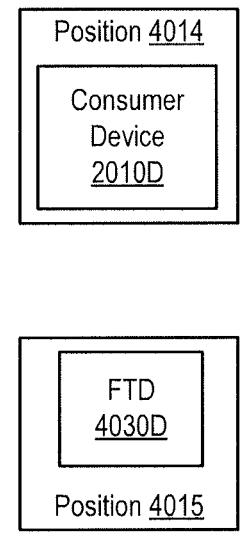

Turning now to FIG. 4, consumer devices at positions are illustrated, according to one or more embodiments. As shown, consumer device 2010A may be at a position 4010, a financial transaction device (FTD) 4030A may be at a position 4011, and consumer device 2010B and a FTD 4030B may be at a position 4012. In one or more embodiments, a FTD may include one or more of an ATM, a cash register, a point of sale (POS) device, a POS terminal, and a bank teller window device, among others. As illustrated, physical location 4020 may include positions 4010-4012. In one or more embodiments, physical location 4020 may be a physical location of a business establishment. As shown, consumer device 2010C, a FTD 4030C, and a physical location 4021 may be at a position 4013. In one or more embodiments, physical location 4021 may be a physical location of a business establishment. As illustrated, consumer device 2010D may be at a position 4014, and a FTD 4030D may be at a position 4015.

Figure 5A:
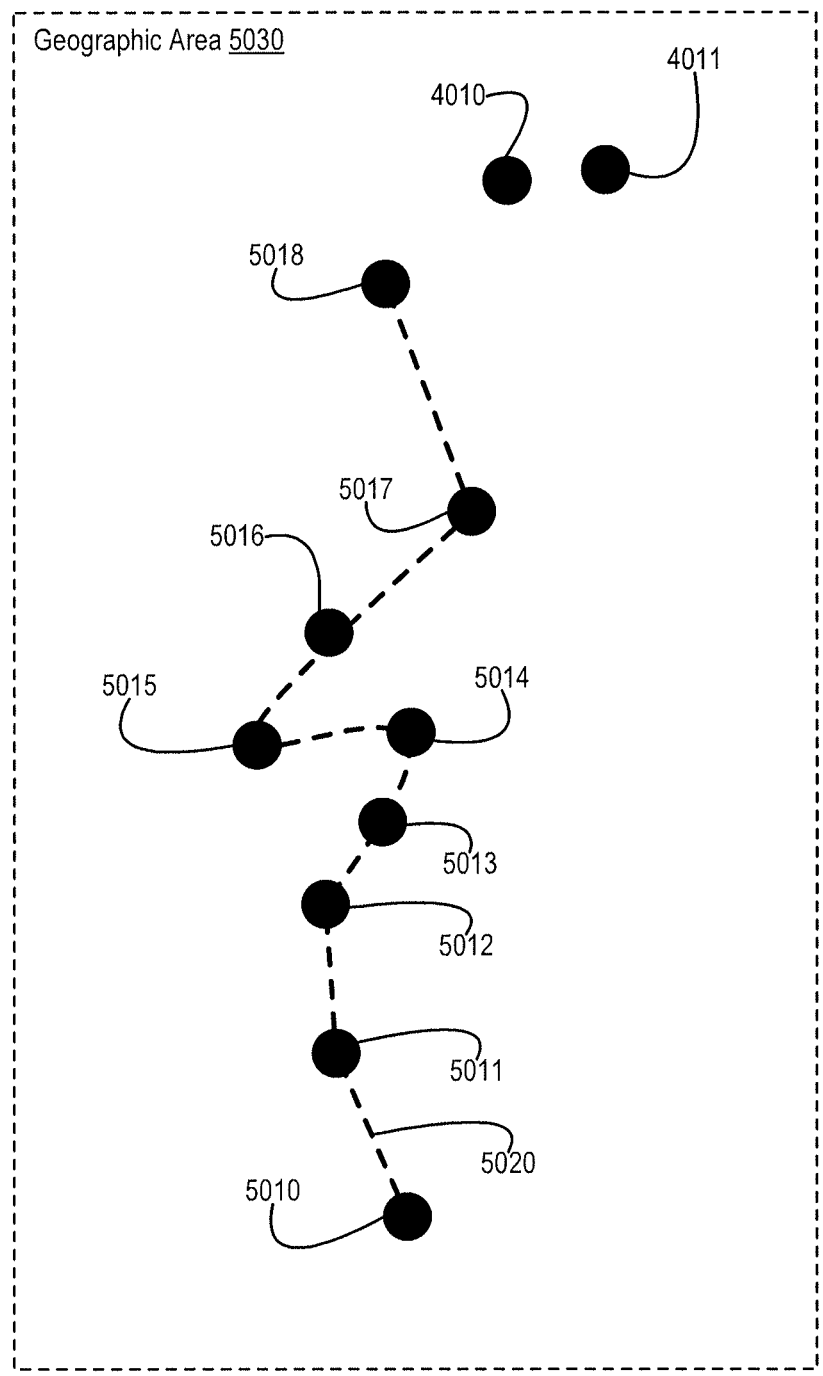
FIGS. 5A and 5B illustrate examples positions of consumer devices, according to one or more embodiments.
Figure 5B:
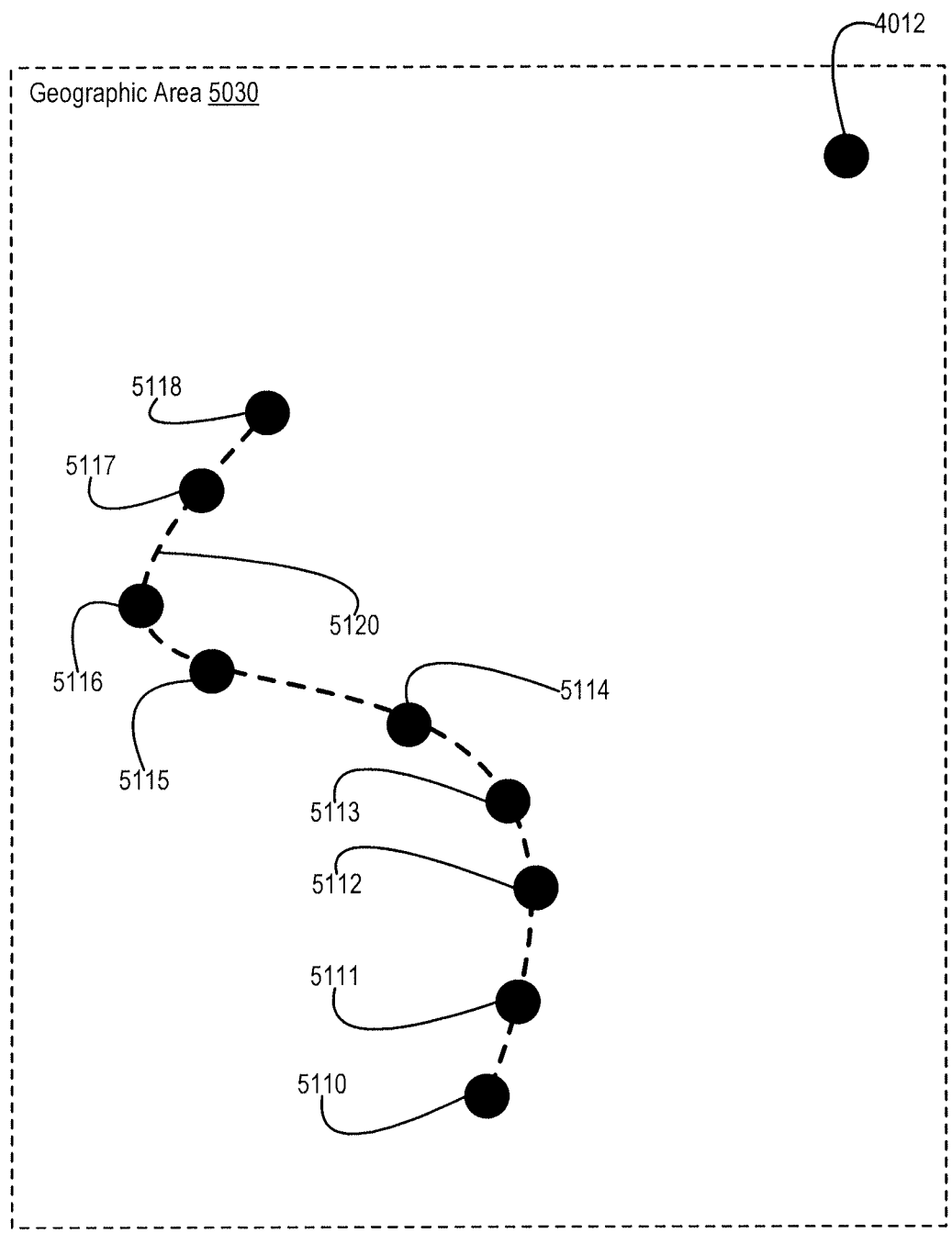

Turning now to FIGS. 5A and 5B, positions of consumer devices are illustrated, according to one or more embodiments. As shown in FIG. 5A, positions 5010-5018, 4010, and 4011 may be included in a geographic area 5030. For example, positions 5010-5018, 4010, and 4011 may correspond to multiple physical locations. In one or more embodiments, a path 5020 may be inferred and/or interpolated via positions 5010-5018. For example, consumer device 2010A may report positions 5010-5018. For instance, positions 5010-5018 may be reported at periodically to computer system 1010A, and computer system 1010A may interpolate path 5020 via positions 5010-5018. In one or more embodiments, a first position of positions 5010-5018 may be proximate to a second position of positions 5010-5018. In one example, position 5010 may be proximate to position 5011. In another example, position 5015 may be proximate to position 5014.

In one or more embodiments, computer system 1010A may determine an authorization of a financial transaction based one or more of positions 5010-5018, 4010, and 4011 and/or path 5020. For example, path 5020 may indicate that consumer device may be within an acceptable distance from one or more of positions 4010 and 4011. For instance, computer system 1010A may permit the authorization of the financial transaction based on determining that path 5020 indicates that consumer device is within the acceptable distance from the one or more of positions 4010 and 4011.

As illustrated, in FIG. 5B, positions 5110-5118 and 4012 may be included in geographic area 5030. For example, positions 5110-5118 and 4012 may correspond to multiple physical locations. In one or more embodiments, a path 5120 may be inferred and/or interpolated via positions 5110-5118. For example, consumer device 2010B may report positions 5110-5118. For instance, positions 5110-5118 may be reported at periodically to computer system 1010A, and computer system 1010A may interpolate path 5120 via positions 5110-5118. In one or more embodiments, a first position of positions 5010-5018 may be proximate to a second position of positions 5110-5118. In one example, position 5110 may be proximate to position 5111. In another example, position 5115 may be proximate to position 5114.

In one or more embodiments, computer system 1010A may determine an authorization of a financial transaction based one or more of positions 5110-5118 and 4012 and/or path 5120. For example, path 5120 may indicate that consumer device may not be within an acceptable distance from one or more of position 4012. For instance, computer system 1010A may not permit the authorization of the financial transaction based on determining that path 5120 indicates that consumer device is not within the acceptable distance from position 4012.

Figure 6A:
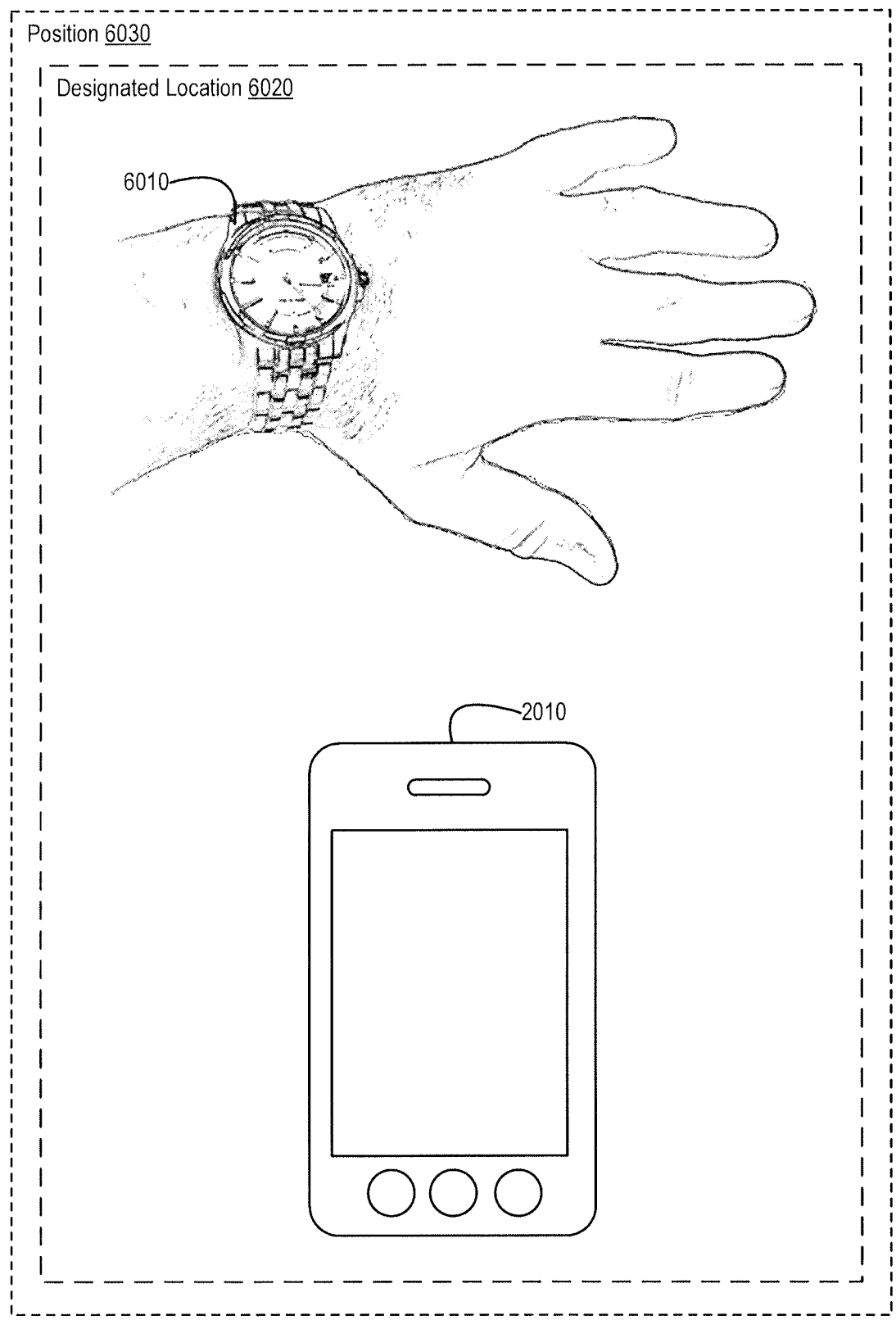
FIGS. 6A and 6B illustrate examples of initializing new devices, according to one or more embodiments.
Figure 6B:
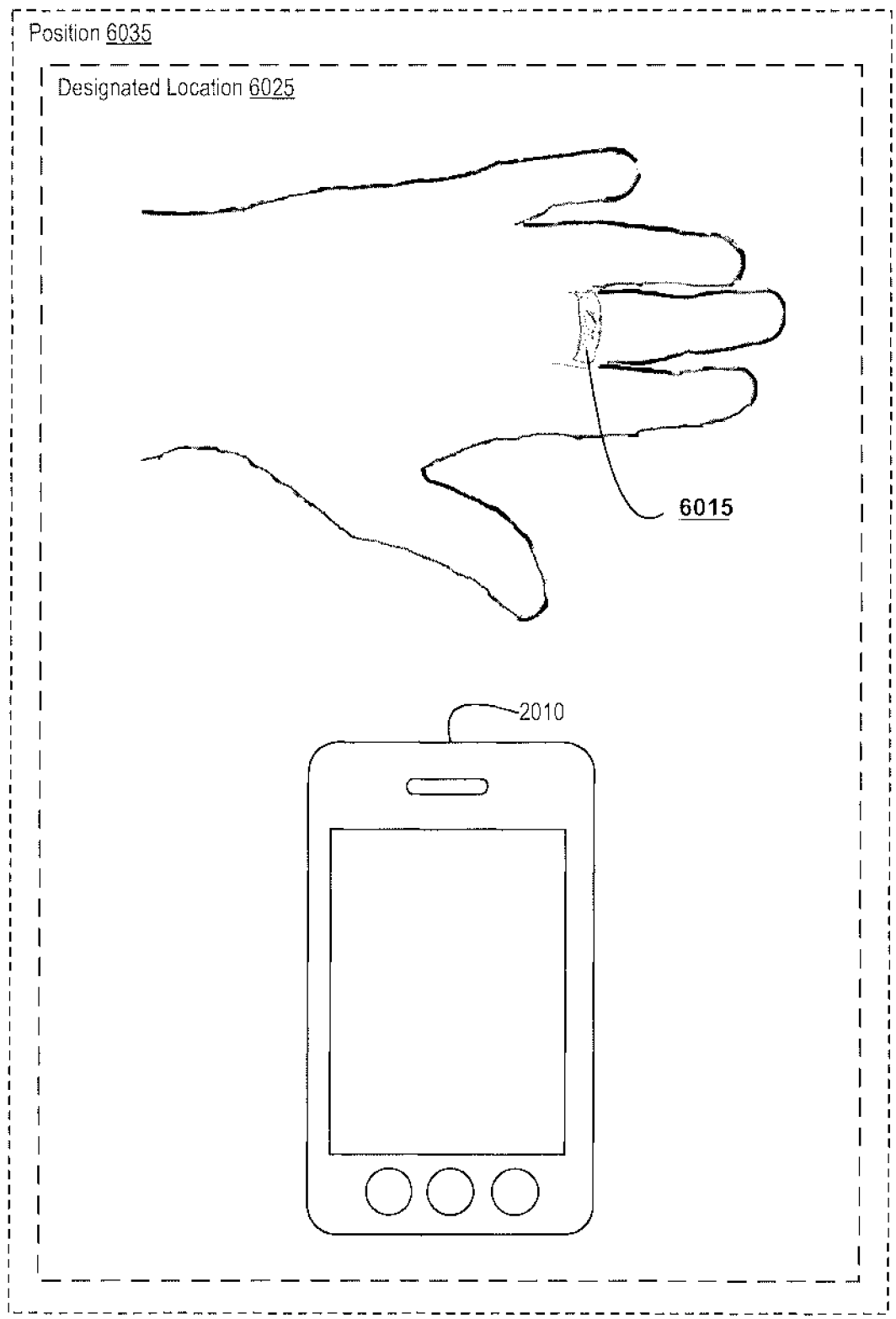

Turning now to FIGS. 6A and 6B, initializing new devices are illustrated, according to one or more embodiments. As shown in FIG. 6A, a new device, such as a smartwatch 6010, may be initialized at a designated location 6020. As illustrated, designated location 6020 may be at and/or associated with a position 6030. In one or more embodiments, designated location 6020 may include a residence of a consumer, a location of a financial entity (e.g., a headquarters, a branch location, etc.), or some other designated area or location. For example, when the consumer is at a designated location or area, an agent of the financial entity may not be needed to be present for the person to bind and/or combine a new consumer device to an identity of the consumer.

In one or more embodiments, the consumer, at designated location 6020, may utilize an online APP or a smartphone APP, connect to a computer system of the financial entity, and bind a new consumer device to the identity of the consumer. For example, the consumer may utilize APP 2320 via consumer device 2010 to connect to computer system 1010A and bind smartwatch 6010 to the identity of the consumer. For instance, a future authorization of a financial transaction may be based on a combination of consumer device 2010 and smartwatch 6010.

As shown in FIG. 6B, a new device, such as a ring 6015, may be initialized at a designated location 6025. As illustrated, designated location 6025 may be at and/or associated with a position 6035. In one example, designated location 6025 may be designated location 6020, and position 6035 may be position 6030. In another example, designated location 6025 may be different from designated location 6020, and position 6035 may be different from position 6030. In one or more embodiments, designated location 6020 may include a residence of a consumer, a location of a financial entity (e.g., a headquarters, a branch location, etc.), or some other designated area or location. For example, when the consumer is at a designated location or area, an agent of the financial entity may not be needed to be present for the person to bind and/or combine a new consumer device to an identity of the consumer.

In one or more embodiments, the consumer, at designated location 6025, may utilize an online APP, connect to a computer system of the financial entity, and bind a new consumer device to the identity of the consumer. For example, the consumer may utilize APP 2320 via consumer device 2010 to connect to computer system 1010A and bind ring 6015 to the identity of the consumer. For instance, a future authorization of a financial transaction may be based on a combination of consumer device 2010 and ring 6015.

In one or more embodiments, binding smartwatch 6010 and/or rind 6015 to the identity of the consumer may include adding smartwatch 6010 and/or rind 6015 to a profile associated with the consumer. For example, computer system 1010A may store the profile associated with the consumer and may add smartwatch 6010 and/or rind 6015 to the profile associated with the consumer. In one or more embodiments, a future authorization of a financial transaction may be based a minimum number of identifications from a minimum number of consumer devices (e.g., consumer device 2010, smartwatch 6010, ring 6015, etc.).

Figure 7:
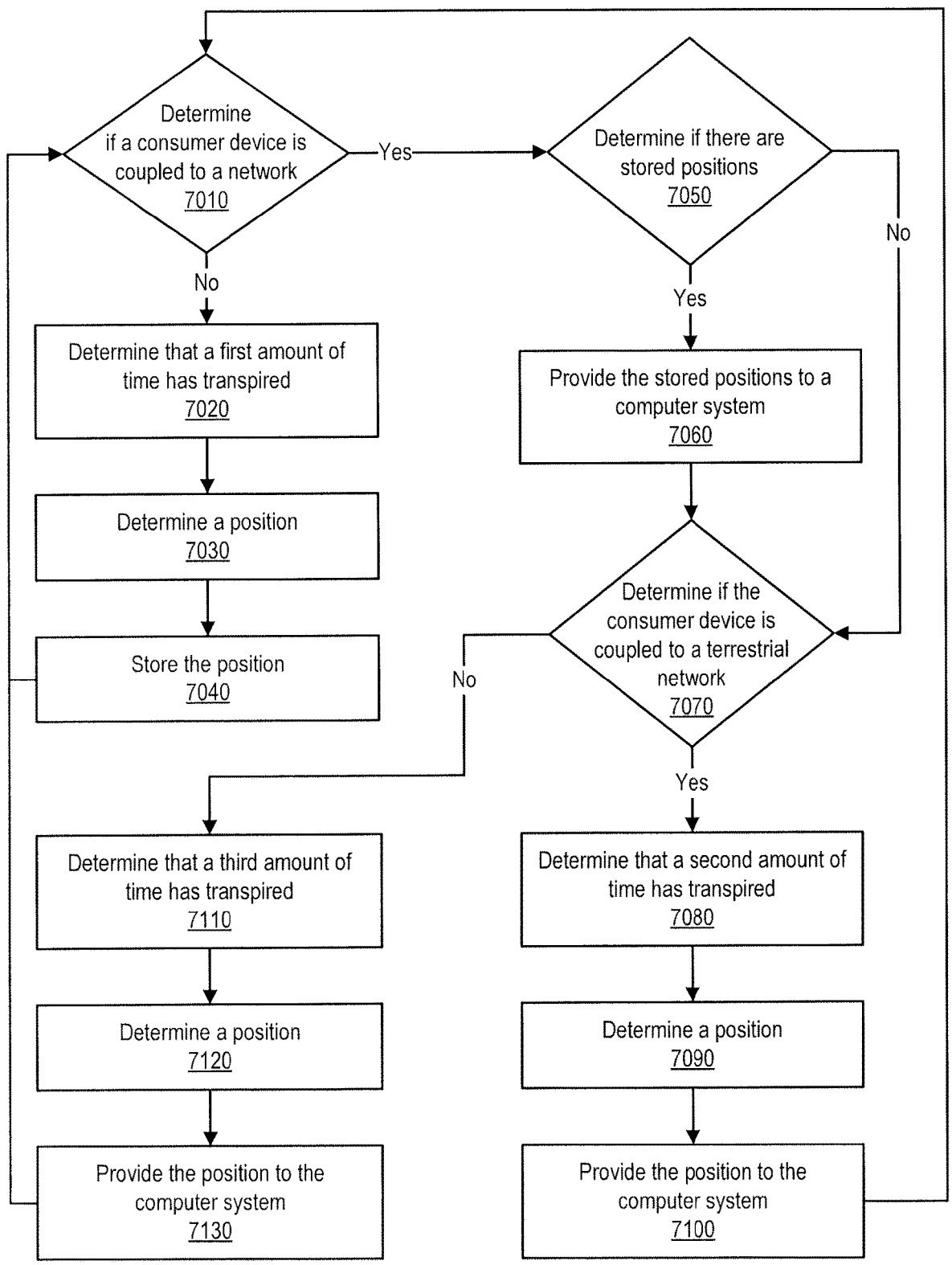
FIG. 7 illustrates an example method of operating a consumer device, according to one or more embodiments.

Turning now to FIG. 7, a method of operating a consumer device is illustrated, according to one or more embodiments. At 7010, consumer device 2010 may determine if it is coupled to a network. For example, consumer device 2010 may determine if it is coupled to one or more of a wired network and a wireless network. If consumer device 2010 determines that it is not coupled to a network, consumer device 2010 may determine that a first amount of time has transpired, at 7020. At 7030, a position may be determined. For example, consumer device 2010 may determine the position (e.g., the position of consumer device 2010) via a GPS. For instance, consumer device 2010 may determine its position via receiving and processing ranging signals generated and transmitted by satellites and/or pseudolites of the GPS.

At 7040, the position may be stored. For example, consumer device 2010 may store the position via one or more of memory media 2200 and 2300. In one or more embodiments, the method may proceed to 7010. If consumer device 2010 determines that it is coupled to a network, consumer device 2010 may determine if there are stored positions, at 7050. If there are stored positions, consumer device 2010 may provide the stored positions to a computer system, at 7060. For example, consumer device 2010 may provide the stored positions to computer system 1010A via the network. For instance, the network may be or include network 3010.

If there are not stored positions, consumer device 2010 may determine if it is coupled to a terrestrial network, at 7070. If consumer device 2010 is coupled to a terrestrial network, consumer device 2010 may determine that a second amount of time has transpired, at 7080.

At 7090, a position may be determined. In one or more embodiments, method element 7090 may be performed in accordance with method element 7030. At 7100, consumer device 2010 may provide the position to the computer system. For example, consumer device 2010 may provide the position to the computer system via a network. For instance, the network may be or include network 3010. In one or more embodiments, the method may proceed to 7010.

If consumer device 2010 is not coupled to a terrestrial network, consumer device 2010 may determine that a third amount of time has transpired, at 7110. At 7120, a position may be determined. In one or more embodiments, method element 7120 may be performed in accordance with method element 7030. At 7130, consumer device 2010 may provide the position to the computer system. For example, consumer device 2010 may provide the position to the computer system via a network. For instance, the network may be or include network 3010. In one or more embodiments, the method may proceed to 7010.

Figure 8:
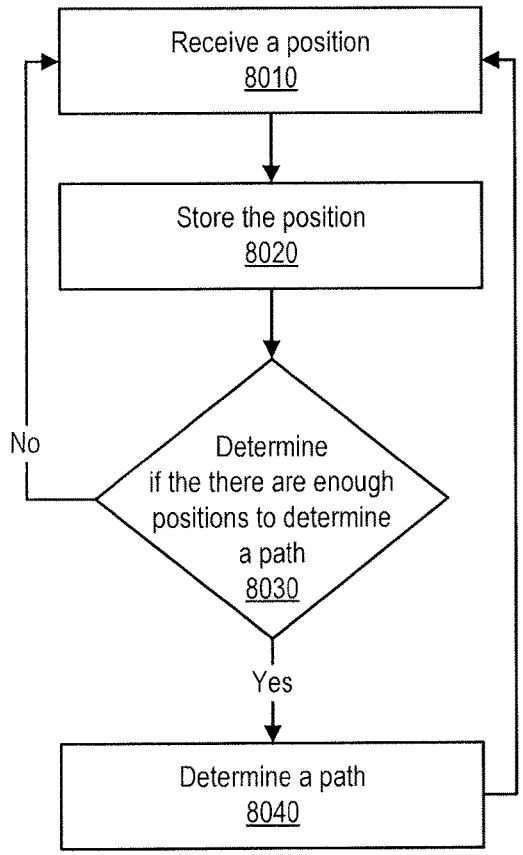
FIG. 8 illustrates an example method of operating a computer system, according to one or more embodiments.

Turning now to FIG. 8, a method of operating a computer system is illustrated, according to one or more embodiments. At 8010, a position (e.g., a position of a consumer device) may be received. For example, computer system 1010A may receive the position. For instance, the position may be received via network 3010. In one or more embodiments, other information associated with the position may be received. For example, the other information may include one or more of an identification of a consumer device and an identification of a consumer, among others. At 8020, the position may be stored. For example, computer system 1010A may store the position. For instance, the position may be stored via one or more of memory media 1200 and 1300.

At 8030, it may be determined if there are enough positions to determine a path. In one or more embodiments, a number of positions may meet or exceed a threshold number of positions. In one example, the threshold number of positions may be a number of positions where a path may be interpolated. In another example, the threshold number of positions may be a number of positions where a path may be extrapolated. If there are not enough positions to determine a path, the method may proceed to 8010. If there are enough positions to determine a path, a path may be determined at 8040. In one example, the path may be determined via interpolation that utilizes the received positions. In another example, the path may be determined via extrapolation that utilizes the received positions. In one or more embodiments, the method may proceed to 8010.

Figure 9:
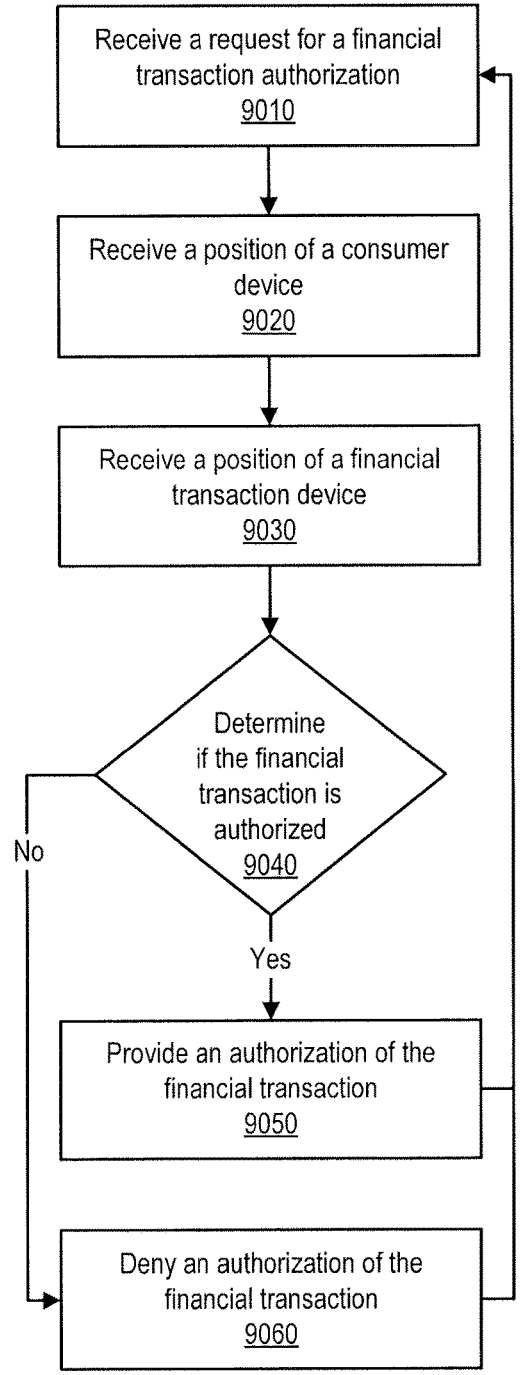
FIG. 9 illustrates an example a method of determining a financial transaction authorization based on at least one position and/or a path, according to one or more embodiments.

Turning now to FIG. 9, a method of determining a financial transaction authorization based on at least one position and/or a path is illustrated, according to one or more embodiments. At 9010, a request for a financial transaction authorization may be received. In one example, the request for the financial transaction authorization may be received from a payment collection device. In a second example, the request for the financial transaction authorization may be received from an ATM. In another example, the request for the financial transaction authorization may be received from a consumer device. In one or more embodiments, the request for the financial transaction authorization may be received via a network. For example, the network may include network 3010.

At 9020, a position of a consumer device may be received. For example, the position of the consumer device may be received from the consumer device. In one or more embodiments, the position of the consumer device may be received via a network. For example, the network may include network 3010. At 9030, a position of a financial transaction device may be received. In one example, the position of the financial transaction device may be received from the financial transaction device. In one instance, the financial transaction device may include a payment collection device. In another instance, the financial transaction device may include an ATM. In another example, the position of the financial transaction device may be received from the consumer device. In one or more embodiments, the position of the financial transaction device may be received via a network. For example, the network may include network 3010.

At 9040, it may be determined if the financial transaction is authorized. In one example, determining if the financial transaction is authorized may be based on the position of the consumer device and the position of the financial transaction device. For instance, determining if the financial transaction is authorized may be based on the position of the consumer device and the position of the financial transaction device being within a distance of each other. In a second example, determining if the financial transaction is authorized may be based on a path. In one instance, determining if the financial transaction is authorized may be based on a path (e.g., path 5020 indicated by positions 5010-5018) that may lead to a position of the financial transaction device. In another instance, determining if the financial transaction is authorized may be based on a path (e.g., path 5120 indicated by positions 5110-5118) that may not lead to a position of the financial transaction device.

If the financial transaction is authorized, an authorization of the financial transaction may be provided, at 9050. In one example, the authorization of the financial transaction may be provided to the financial transaction device. In another example, the authorization of the financial transaction may be provided to the consumer device. In one or more embodiments, the authorization of the financial transaction may be provided via a network. For example, the network may include network 3010. If the financial transaction is not authorized, an authorization of the financial transaction may be denied, at 9060. In one example, a denial of the authorization of the financial transaction may be provided the financial transaction device. In another example, a denial of the authorization of the financial transaction may be provided the consumer device. In one or more embodiments, a denial of the authorization of the financial transaction may be provided via a network. For example, the network may include network 3010. In one or more embodiments, the method may proceed to 9010.

Figure 10:
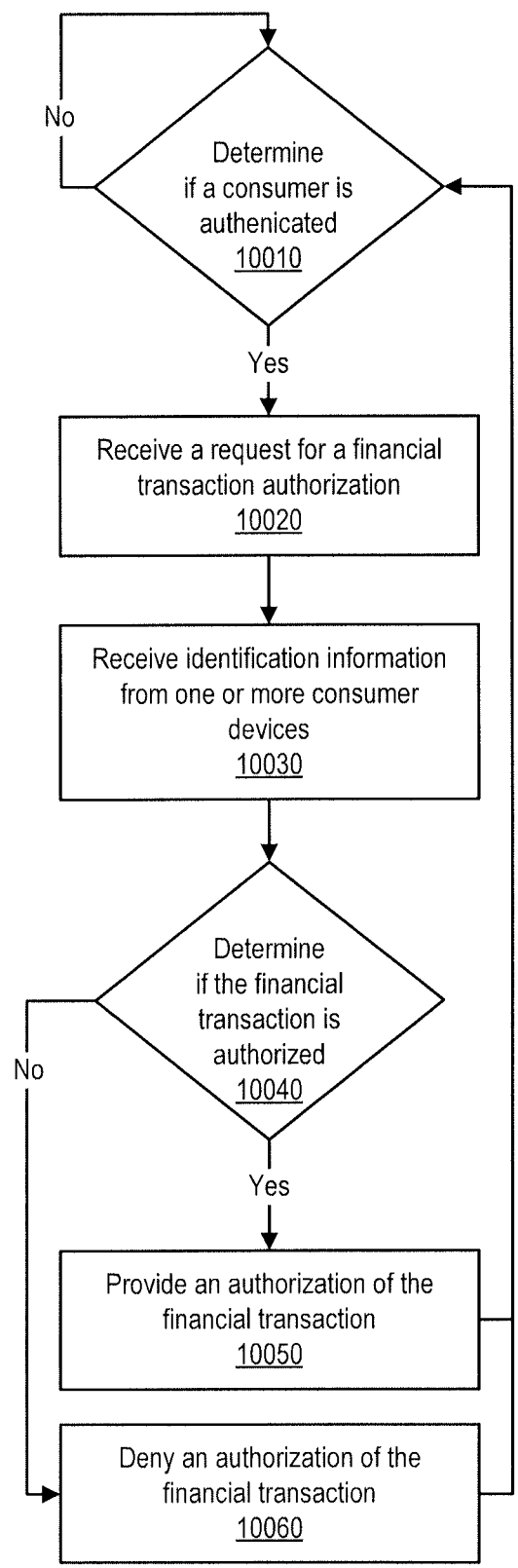
FIG. 10 illustrates an example method of determining a financial transaction authorization based one or more identifications, according to one or more embodiments.

Turning now to FIG. 10, a method of determining a financial transaction authorization based one or more identifications is illustrated, according to one or more embodiments. At 10010, it may be determined if a consumer is authenticated. In one or more embodiments, one or more consumer devices may authenticate the consumer. For example, a consumer device may determine if the consumer is authenticated via one or more data points that may include body temperature, a number of heartbeats per time period, a blood pressure measurement, a blood oxidation level, a scan of cell tissue of the person, an arterial and/or vein pattern proximate to a surface of a skin of the user, and/or other biological measurements, among others. If the consumer is not authenticated, the method may proceed to 10010.

If the consumer is authenticated, a request for a financial transaction authorization may be received, at 10020. In one example, the request for the financial transaction authorization may be received from a payment collection device. In a second example, the request for the financial transaction authorization may be received from an ATM. In another example, the request for the financial transaction authorization may be received from a consumer device. In one or more embodiments, the request for the financial transaction authorization may be received via a network. For example, the network may include network 3010.

At 10030, identification information from one or more consumer devices may be received. For example, identification information from one or more of consumer devices 2010, 6010, and 6015, among others, may be received. In one or more embodiments, the identification information from the one or more consumer devices may be received via a network. For example, the network may include network 3010. At 10040, it may be determined if the financial transaction is authorized. In one or more embodiments, determining if the financial transaction is authorized may include utilizing one or more attributes, one or more criteria, and/or identifications. In one example, determining if the financial transaction is authorized may be based on a minimum number of identifications. For instance, a minimum number of identifications may be required based on a value of the financial transaction.

In a second example, a minimum number of identifications may be based on a distance from a location. In one instance, two or more identifications from two or more respective consumer devices may be required for a transaction at a location that is more than ten miles from a location of a residence of the consumer. In another instance, three or more identifications from three or more respective consumer devices may be required for a transaction at a location that is more than thirty miles from a location of the residence of the consumer.

If the financial transaction is authorized, an authorization of the financial transaction may be provided, at 10050. In one example, the authorization of the financial transaction may be provided the financial transaction device. In another example, the authorization of the financial transaction may be provided the consumer device. In one or more embodiments, the authorization of the financial transaction may be provided via a network. For example, the network may include network 3010. If the financial transaction is not authorized, an authorization of the financial transaction may be denied, at 10060. In one example, a denial of the authorization of the financial transaction may be provided the financial transaction device. In another example, a denial of the authorization of the financial transaction may be provided the consumer device. In one or more embodiments, a denial of the authorization of the financial transaction may be provided via a network. For example, the network may include network 3010. In one or more embodiments, the method may proceed to 10010.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
a memory medium comprising instructions executable by a processor; and
the processor communicatively coupled to the memory, configured to:
bind a first consumer device with a user at a first designated location, wherein the first designated location is associated with a location of a financial entity;
bind a second consumer device with the user at a second designated location, wherein the second designated location is associated with a residence of the user;
receive, via a network, a plurality of physical locations of the first consumer device for the user;
receive, via the network, a physical location of a financial transaction device;
receive a request for a financial transaction;
determine a path comprising the plurality of physical locations of the first consumer device, wherein determining the path comprises interpolating between the physical locations of the first consumer device;
determine the path comprises the physical location of the financial transaction device;
receive identification information from two or more consumer devices associated with the user that comprise the second consumer device;
determine a number of consumer devices that are present based on the received identification information;
determine a minimum number of consumer devices that are present for authentication;
determine the number of consumer devices that are present is greater than or equal to the minimum number of consumer devices that are present for authentication; and
authorize the request in response to determining that the path comprises the physical location of the financial transaction device and the number of consumer devices that are present is greater than or equal to the minimum number of consumer devices that are present for authentication, wherein the consumer devices that are present have been previously bounded to the user.

2. The system of claim 1, wherein a first physical location of the plurality of physical locations of the first consumer device is proximate to a second physical location of the plurality of physical locations of the first consumer device.

3. The system of claim 2, wherein at least a third physical location of the plurality of physical locations of the first consumer device is the first physical location.

4. The system of claim 1, wherein:
receiving the plurality of physical locations comprises periodically receiving physical locations; and
a period of receiving is based on a type of the network.

5. The system of claim 1, wherein:
the processor is further configured to receive, via the network, biometric data of a consumer associated with the first consumer device; and
authorizing the request is based at least in part on the biometric data of the consumer.

6. The system of claim 1, wherein the processor is further configured to:
receive, via the network, a first physical location of the first consumer device;
determine that the first physical location of the first consumer device is associated with a designated physical location utilizable to securely add a second consumer device to a profile associated with a consumer that is associated with the first consumer device; and
add the second consumer device to the profile.

7. The system of claim 1, wherein:
the first consumer device is associated with a consumer; and
the path further comprises a second plurality of physical locations of a second device that is associated with the consumer.

8. A method, comprising:
binding a first consumer device with a user at a first designated location, wherein the first designated location is associated with a location of a financial entity;
binding a second consumer device with the user at a second designated location, wherein the second designated location is associated with a residence of the user;
receiving, via a network, a plurality of physical locations of the first consumer device for the user;
receiving, via the network, a physical location of a financial transaction device;
receiving a request for a financial transaction;
determining a path comprising the plurality of physical locations of the first consumer device, wherein determining the path comprises interpolating between the physical locations of the first consumer device;
determining the path comprises the physical location of the financial transaction device;
receiving identification information from two or more consumer devices associated with the user that comprise the second consumer device;
determining a number of consumer devices that are present based on the received identification information;
determining a minimum number of consumer devices that are present for authentication;
determining the number of consumer devices that are present is greater than or equal to the minimum number of consumer devices that are present for authentication; and
authorizing the request in response to determining that the path comprises the physical location of the financial transaction device and the number of consumer devices that are present is greater than or equal to the minimum number of consumer devices that are present for authentication, wherein the consumer devices that are present have been previously bounded to the user.

9. The method of claim 8, wherein a first physical location of the plurality of physical locations of the first consumer device is proximate to a second physical location of the plurality of physical locations of the first consumer device.

10. The method of claim 9, wherein at least a third physical location of the plurality of physical locations of the first consumer device is the first physical location.

11. The method of claim 8, wherein:
receiving the plurality of physical locations of the first consumer device comprises periodically receiving physical locations; and
a period of the receiving the plurality of physical locations of the first consumer device is based on a type of the network.

12. The method of claim 8, further comprising:
receiving, via the network, biometric data of a consumer associated with the first consumer device;
wherein authorizing the request is based at least in part on the biometric data of the consumer.

13. The method of claim 8, further comprising:
receiving, via the network, a first physical location of the first consumer device;
determining that the first physical location of the first consumer device is associated with a designated physical location utilizable to securely add a second consumer device to a profile associated with a consumer that is associated with the first consumer device; and
adding the second consumer device to the profile.

14. The method of claim 13, wherein:
the first consumer device is associated with a consumer; and
the path further comprises a second plurality of physical locations of a second device that is associated with the consumer.

15. A computer-readable non-transient memory medium that comprises executable instructions that when executed by a processor causes the processor to:
bind a first consumer device with a user at a first designated location, wherein the first designated location is associated with a location of a financial entity;
bind a second consumer device with the user at a second designated location, wherein the second designated location is associated with a residence of the user;
receive, via a network, a plurality of physical locations of the first consumer device for the user;
receive, via the network, a physical location of a financial transaction device;
receive a request for a financial transaction;
determine a path comprising the plurality of physical locations of the first consumer device, wherein determining the path comprises interpolating between the physical locations of the first consumer device;
determine the path comprises the physical location of the financial transaction device;
receive identification information from two or more consumer devices associated with the user that comprise the second consumer device;
determine a number of consumer devices that are present based on the received identification information;
determine a minimum number of consumer devices that are present for authentication;
determine the number of consumer devices that are present is greater than or equal to the minimum number of consumer devices that are present for authentication; and
authorize the request in response to determining that the path comprises the physical location of the financial transaction device and the number of consumer devices that are present is greater than or equal to the minimum number of consumer devices that are present for authentication, wherein the consumer devices that are present have been previously bounded to the user.

16. The computer-readable non-transient memory medium of claim 15, wherein a first physical location of the plurality of physical locations of the first consumer device is proximate to a second physical location of the plurality of physical locations of the first consumer device.

17. The computer-readable non-transient memory medium of claim 16, wherein at least a third physical location of the plurality of physical locations of the first consumer device is the first physical location.

18. The computer-readable non-transient memory medium of claim 15, wherein receiving the plurality of physical locations of the first consumer device comprises periodically receiving physical locations.

19. The computer-readable non-transient memory medium of claim 15, further comprising executable instructions that when executed by the processor causes the processor to:
receive, via the network, biometric data of a consumer associated with the first consumer device; and
wherein authorizing the request is based at least in part on the biometric data of the consumer.

20. The computer-readable non-transient memory medium of claim 15, wherein the system further:
the first consumer device is associated with a consumer; and
the path further comprises a second plurality of physical locations of a second device that is associated with the consumer.

* * * * *